Patented Feb. 24, 1931

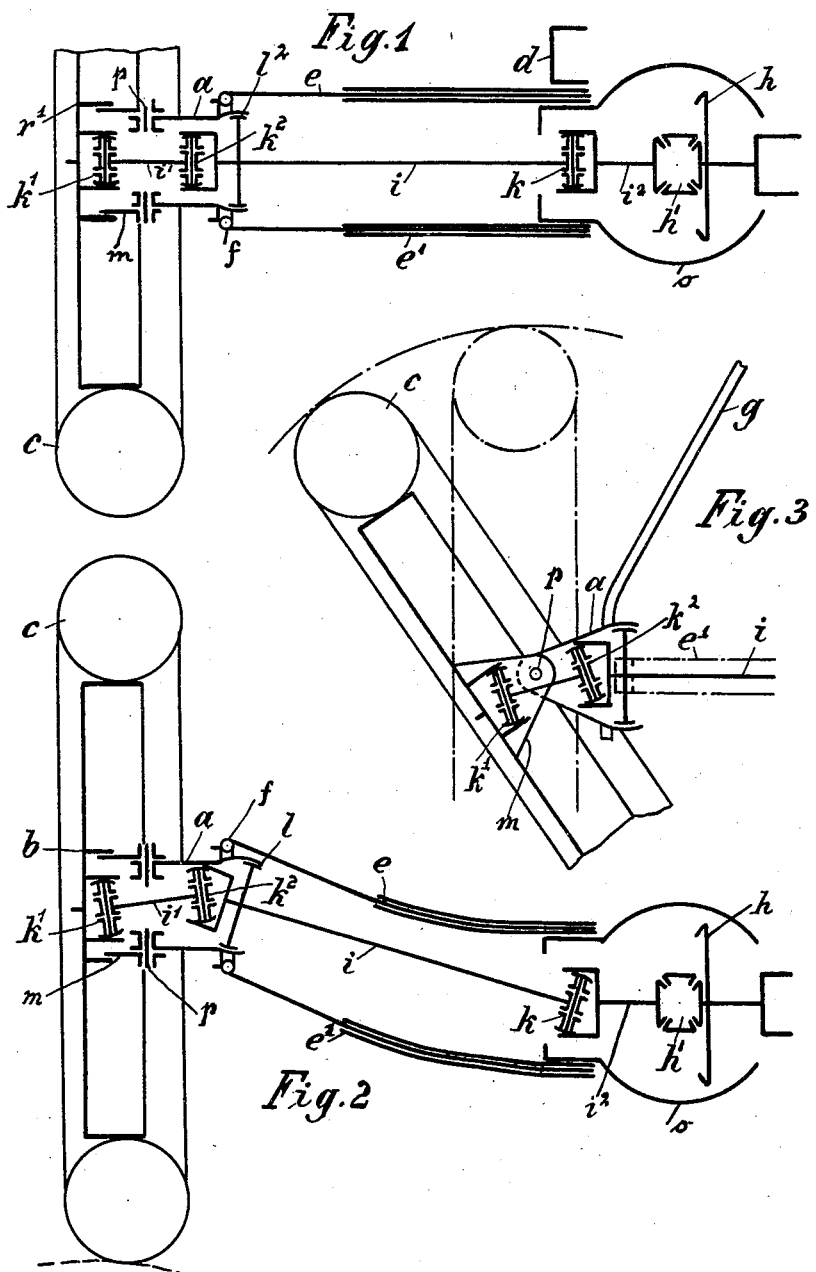

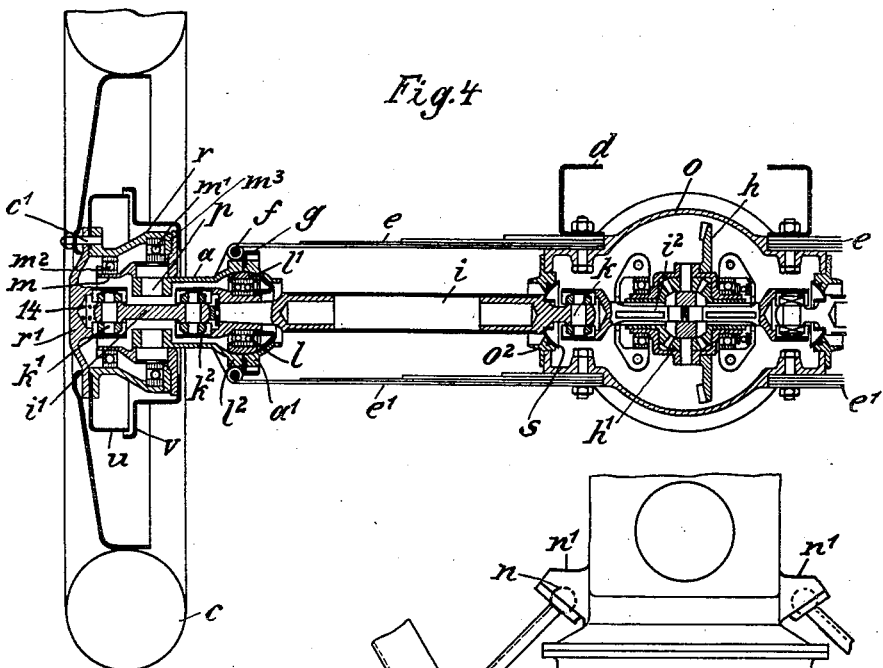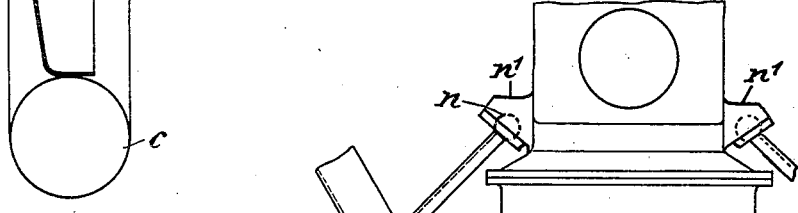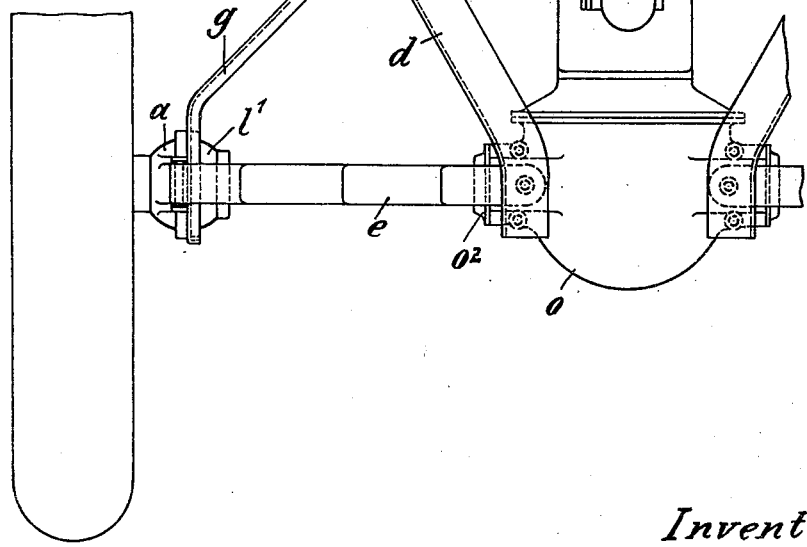

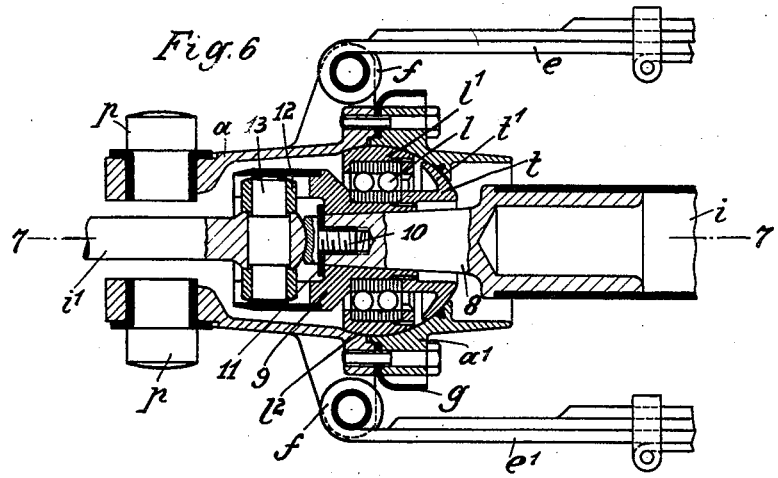
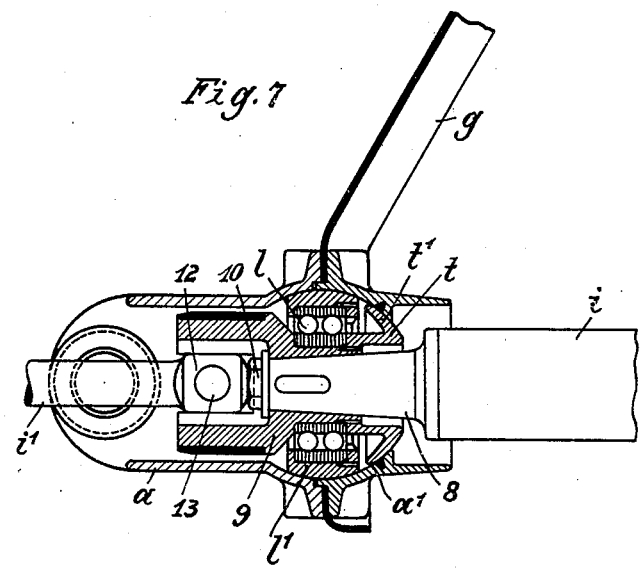

1,794,145

UNITED STATES PATENT OFFICE

RICHARD BUSSIEN, OF BERLIN-WEISSENSEE, GERMANY, ASSIGNOR TO VORAN AUTO-MOBIL-BAU AKTIENGESELLSCHAFT, OF BERLIN, GERMANY

MOTOR VEHICLE

Application filed December 28, 1926, Serial No. 157,472, and in Germany February 22, 1926.

My invention relates to improvements in motor vehicles, and more particularly in motor vehicles of the type in which the front wheels are driving and steering wheels. In vehicles of this type such as are now in use power is transmitted to the front wheels by means of transverse sectional shafts connected with each other by universal joints. In constructions now in use one or, at the most, two joints are provided in the mechanism transmitting the power to each wheel. I have found that the said two joints are not sufficient for practical purposes, and that when turning the wheels for steering while simultaneously the springs provided between the frame and the wheels are deformed, the strain of the joints caused by the double angular position of the sectional shafts and the large displacement of the joints is such that the joints are subject to rapid wear, that they are frequently broken, and that steering of the vehicle is impaired. The object of the present invention is to provide a driving mechanism for vehicles of the class referred to in which the said objection is obviated, and with this object in view my invention consists in providing at least three universal joints in the sectional shafts connecting the front wheels with the driving mechanism. Thereby large angular displacements of the sectional shafts are avoided, and, further, the sectional shafts are sufficiently yielding in longitudinal direction, so that even when deforming the shafts within vertical and horizontal planes the strain on the joints is comparatively small, the wear is reduced to a minimum, and the danger of breakage is avoided. In the preferred construction the said universal joints are in the form of Cardan joints.

For the purpose of explaining the invention an example embodying the same has been shown in the accompanying drawings, in which the same letters of reference have been used in all the views to indicate corresponding parts. In said drawings, Fig. 1 is a diagrammatical elevation showing one of the front wheels of the vehicle, a part of the driving mechanism and a part of the frame, Fig. 2 is a similar sectional elevation showing one of the front wheels riding over an obstruction in the roadway, Fig. 3, is a diagrammatical plan view showing one of the front wheels turned laterally about its vertical pivot pins for steering, Fig. 4, is a sectional elevation showing one of the front wheels and a part of the driving gearing and the frame, Fig. 5, is a partial top plan view showing the front wheel and a part of the frame, Fig. 6, is a detail sectional elevation showing one of the Cardan joints and, Fig. 7, is a sectional plan view of the said Cardan joint taken on the line 7—7 of Fig. 6.

In the embodiment of the invention shown in the drawings a casing or housing $o$ is mounted on the frame $d$ of the vehicle, said casing also being secured to and extended forward of the motor casing. The motor driven shaft is extended forward into said case and operatively connected with differential gearing in the casing. To the front end of the said casing upper and lower leaf springs $e$ and $e^1$ are fixed which project laterally therefrom and in opposite directions. Each pair of springs $e$, $e^1$ serves for connecting one of the front wheels $c$ with the frame $d$ of the vehicle. The free ends $f$ of the springs of each pair $e$, $e^1$ are pivoted to and support a sleeve $a$ provided with diametrically oppositely arranged vertical pivot pins $p$, about which the wheel $c$ is adapted to be turned on an axis extending in the plane of rotation of said wheel to effect steering of the vehicle as shown in Fig. 3, and on which pins a knuckle member $m$ is pivotally mounted. A cylindrical hub member $r$ is rotatably mounted on the knuckle member $m$ by anti-friction bearings $m^1$, $m^2$ and to which hub member $r$ a sleeve or hub $r$ is rotatably mounted to which the front wheel $c$ is fixed, as is known to those skilled in the art. The anti-friction bearing $m^1$ is closed at the inner side by a ring $m^3$ fixed to the hub $r$, with a suitable packing medium interposed between the anti-friction bearing $m^1$ and the said ring $m^3$. Thus, if the springs $e$ $e^1$ are deflected when the front wheel rides over an obstruction, as shown in Fig. 2 in a diagrammatical way, the said wheel $c$ is held in the same angular position relatively to the surface of the road, the springs $e$, $e^1$ providing a parallel guide for the sleeve $a$.

In Fig. 4 I have shown only a part of the driving gearing, the said part consisting of a bevel gear wheel $h$ adapted to mesh with a pinion on the motor shaft, not shown, and the usual differential gearing $h^1$. Shaft $i^2$ of the said differential gearing is connected with a hollow shaft $i$ by means of a universal joint, preferably a Cardan joint $k$. The construction of the said Cardan joint is known in the art. At its outer end the hollow shaft $i$ is connected by a Cardan joint $k^2$ of any known or preferred construction with a shaft $i^1$, and the said shaft $i^1$ is connected by a Cardan joint $k^1$ with a disk $r^1$ forming a part of the hub of the front wheel $c$ and fastened by means of bolts $c^1$ to the hub sleeve $r$ and the wheel $c$. The shaft $i$ terminates in a tapered extension 8 to which is keyed a bifurcated sleeve 9. Said sleeve 9 is mounted in an anti-friction bearing $l$, the outer race ring of which is fixed to a ring $l^1$ mounted in an arcuately formed bearing surface $l^2$ at the end of the sleeve or housing $a$ and a cap $a^1$ fixed thereto, the cap $a^1$ having a bearing surface to correspond with and opposed to the arcuate bearing surface $l^2$ at the end of the housing or sleeve $a$. A sleeve $t$ having screw threaded connection with the inner end of the sleeve 9 is arranged with a laterally and rearwardly projecting flange $t^1$ the outer surface of which flange is of arcuate form to correspond with the arcuate surface of the cap $a^1$ to form a lubricant retaining joint therewith, as shown in Figures 6 and 7.

To the inner end of the hollow shaft $i$ a spherical disk $s$ is secured which is in tight engagement with a ring $o^2$ fixed to the sidewall of the casing $o$, the said disk $s$ and ring $o^2$ closing the casing $o$ so as to prevent the leakage of lubricating medium thereof, and the entrance of dust and dirt into the Cardan joint $k$ and the gearing.

To the hub sleeve $r$ a brake drum $u$ is fixed and the said drum is covered at its inner end by a cap $v$ fixed to the knuckle $m$. Thus, the Cardan joints $k^1$ and $k^2$, the anti-friction bearings $m^1$, $m^2$, $l$ and the bearings $l^1$, $l^2$ are confined within a casing provided by the hub disk on cap $r^1$, the hub member $r$, the ring $m^3$, knuckle $m$, the sleeve $a$, the cap $a^1$ and the sleeve $t$, so that all of the said joints and bearings can be effectively lubricated.

Between the cap $a^1$ and the inner end of the sleeve $a$ a brace $g$ is secured which is formed at its opposite end with a ball pivot $n$ engaging in a spherical socket $n^1$ provided on the casing $o$, the object of the said brace $g$ being to hold the outer end of the springs $e$, $e^1$ and the sleeve $a$ in position relatively to the frame. A further object of the brace $g$ is to reinforce the sleeve in order to prevent its displacement under the influence of the driving, steering and braking effects. By reason of the ball and socket joint $n$, $n^1$ the said brace will follow the vertical deflections of the springs $e$, $e^1$ and transmit the tractive force of the front wheel $c$ to the frame.

In the operation of the vehicle the power of the engine is transmitted through the usual change speed gear (not shown), the bevel gear wheel $h$ and the differential gearing $h^1$ to short shafts $i^2$ projecting from the differential gearing to opposite sides, and the power is further transmitted through the differential gearing to the front wheels $c$ through the shafts $i$ and $i^1$. By arranging at least three Cardan joints $k$, $k^1$ and $k^2$ which provide flexible and axially yielding connections between the parts, the displacement of the parts of the joints and the relative displacement of the shafts $i^2$, $i$, $i^1$ in angular direction are reduced to a minimum, the angles at which the sectional shafts are positioned relative to each other when rocking the front wheels for steering and simultaneously springing of the springs $e$ and $e^1$ do not depart much from 180°. The joint $k$ is subjected to an angular deflection only in case springing of the springs $e$, $e^1$ takes place. The springs $e$, $e^1$ arranged in pairs at each side of the frame and for each front wheel, provide elastic supports for the frame which upon distortion do not interfere with the proper operation of the driving gearing. By constructing the said springs in the form of parallel guides the angular position of the wheels $c$ relatively to the road remains constant in case of deflection of the springs. The arcuate bearing ring $l^1$ for the outer end of the shaft $i$ permits deflection of the springs in the manner shown in Fig. 2 without causing any bending strain on the shaft $i$ since the bearing $l$, $l^1$ of the shaft $i$ will follow the displacements of the shaft $i$ by sliding in the arcuate bearing $l^2$.

By dismounting the front wheel $c$ together with the hub disk or cup $r^1$, the parts enclosed within the hub $r$ of the wheel, and more particularly the Cardan joints $k^1$ and $k^2$ and the sectional shaft $i^1$ are readily accessible and may be taken out. As appears from Fig. 4, all the joints and bearings are confined within tight casings, so that destruction of the said parts by foreign matter entering therein is impossible and the said parts can be thoroughly lubricated.

In Figs. 1 to 3 I have shown the different relative positions assumed by the shafts $i$, $i^1$ and $i^2$ caused by deflection of the springs $e$, $e^1$ and a rocking movement of the front wheels $c$ in steering.

Though the construction of Cardan joints is known to those skilled in the art, I deem it advisable to describe the construction of the Cardan joint preferred by me with reference to Figs. 6 and 7, which figures show the Cardan joint $k^2$ provided between the shafts $i$ and $i^1$, and in addition the sleeve $a$ with the parts connected thereto and the bearing for the outer end of the shaft $i$.

As shown in the said figures, the shaft $i$ terminates in a tapered extension 8 to which is keyed tubular member 9 having an enlarged co-axially extended bifurcated portion, said member being held on the tapered shaft extension 8 against axial displacement by a screw 10 and a washer 11. The bifurcated end of said member 9 is provided with parallel bearing faces between which trunnion blocks 12 are guided, which blocks are mounted on transverse pivot pins 13 fixed to and extending diametrically opposite from the shaft $i^1$. The inner end of the shaft $i^1$ is rounded and is held in contact with the hollowed head of the screw 10 by means of a spring 14 arranged between the outer end of said shaft $i^1$ and disk $r^1$, as shown in Fig. 4. Therefore, the shaft $i^1$ is capable of longitudinal displacement in case the shafts $i$, $i^1$ are subjected to a relatively great angular displacement caused by springing of the front wheel in riding over obstructions in the roadway and by steering.

The construction of the Cardan joints $k$ and $k^1$ is similar to the one described with reference to Figs. 6 and 7.

While in describing the invention reference has been made to a particular example embodying the same I wish it to be understood that my invention is not limited to the construction shown in the drawings, and that various changes may be made in the general arrangement of the apparatus and the construction of its parts without departing from the invention.

I claim:

1. In a motor vehicle, the combination with the frame, of a housing mounted on the frame, differential gearing in the housing operatively connected with the motor driven shaft of the vehicle, springs fixed at one end to and extending laterally in superposed parallel pairs from opposite sides of the differential housing, sleeves to which the outer ends of the springs are pivotally connected on axes extending parallel with the longitudinal axis of the vehicle, shafts mounted at the outer end in said sleeves to rotate and have universal movement and the inner end of the shafts having a universal joint connection with driving elements of the differential gearing, wheel hubs mounted on the sleeves to have movement about the axis thereof and movement about an axis in the plane of rotation of the wheel, and shafts having a universal joint connection with the wheel hubs and the first shafts.

2. Driving and steering means for wheels of motor vehicles as claimed in claim 1, wherein the wheel hubs embodying a tubular portion and a disk connected to one end, and the means to mount the wheel hubs upon the sleeves to rotate about the same and have movement on an axis in the plane of rotation of the wheel comprising pivot pins arranged diametrically opposite in the sleeve, and knuckle members mounted on said pins and upon which members the hubs are rotatably mounted by anti-friction bearings.

3. Driving and steering means for wheels of motor vehicles as claimed in claim 1, wherein the ends of the shafts mounted in the sleeves are extended through ring members mounted in an opening in the housing for the differential gearing and having a universal joint connection with the driving elements of the differential gearing within the housing; and a disk of arcuate form fixed to said shafts engaging correspondingly formed seats in the rings.

4. Driving and steering means for wheels of motor vehicles as claimed in claim 1, wherein the universal joints between the shafts, differential gearing and hub elements comprise tubular members fixed to one of said elements having a co-axially extended bifurcated portion, pivot pins fixed in and extending diametrically opposite from the other element, and blocks on said pins having axial sliding connection with the bifurcated portion of the tubular members.

5. In a motor vehicle, the combination with the frame, of a housing mounted on the frame, differential gearing in the housing operatively connected with the motor driven shaft of the vehicle, springs fixed at one end to and extending laterally in superposed pairs from the differential housing, sleeves to which the outer ends of the springs are pivotally connected to have movement on axes parallel with the longitudinal axis of the vehicle, shafts having a universal joint connection with driving elements of the differential gearing, bifurcated members fixed to the outer ends of the shafts extending co-axially of the shafts, antifriction bearings for said shafts in the sleeves the inner race ring of which bearings is mounted on the bifurcated members and the outer race ring in bearing members having an outer arcuate bearing surface for engagement with a correspondingly formed bearing surface in the sleeves, a perforated cap secured to each sleeve concentric of the shafts for retaining the bearing members in the sleeves having a bearing surface to correspond with the arcuate surface of the bearing members, sleeves mounted on the bifurcated members within the caps having a laterally extending portion, the outer surface of which is arranged to correspond with the arcuate surface of the bearing retaining caps, wheel hubs carried by the first sleeves to rotate about the axis thereof and to have movement on an axis extending in the plane of rotation of the wheel and having an axially inwardly extending bifurcated portion, and shafts having a universal joint connection with the wheel hubs, and diametrically opposite extending pins at the opposite ends with blocks mounted thereon for sliding engagement with the bifurcations of the bifurcate members and bifurcated portions of the hubs to connect said shafts with the hubs and the first shafts to have universal and axial movement relative to said first shafts.

6. Driving and steering means for wheels to motor vehicles as claimed in claim 5, wherein the bifurcated members are retained upon the first shaft by headed screws threaded into the end of the shafts with a washer interposed between the head of the screws and bifurcated members, and the screw heads having a concave in the outer surface, the ends of the second shafts being of convex form for engagement of the concave surface in the screw heads, and a spring interposed between the opposite end of said second shafts and the hubs to urge said shafts in an axial direction toward the first shafts.

7. Driving and steering means for wheels of motor vehicles as claimed in claim 5, wherein the wheel hubs embody a knuckle member mounted upon the first sleeve to have movement on an axis in the plane of rotation of the wheel, a tubular member mounted on the knuckle member to have rotative movement thereon, and a disk fixed to and closing the outer end of the outer tubular portion, and the universal joint connection of the second shafts with the hubs comprises a bifurcation extending inwardly and centrally from the hub disk, and pivot pins extending diametrically opposite from the said shafts and having blocks thereon for axial sliding engagement with said bifurcations of the hub disks.

8. In a motor vehicle, the combination with the frame, of springs arranged in superposed pairs and projecting laterally of said frame, bearing members connected to the outer ends of said springs, braces connected with said members and having a ball and socket connection with a fixed part of the vehicle, wheels mounted on said bearing members to have movement on an axis in the plane of rotation of the wheels, driving gearing, connections between said driving gearing and wheels, each of said connections comprising co-axially arranged shafts having a universal joint connection with each other and one shaft of each pair of shafts having a universal joint connection with the driving gearing and the other shafts having a universal joint connection with the wheels, and bearings in which the outer ends of the one shaft are mounted to rotate and having an arcuate bearing surface.

9. In a motor vehicle, the combination with the frame, of a housing mounted on the frame, differential gearing in said housing operatively connected with the motor driven shaft of the vehicle, a pair of shafts extending laterally from the differential housing, each shaft being connected with a driving element of the differential gearing to have universal and axial movement, sleeves in which the outer ends of the shafts are mounted to rotate and have universal movement, superposed pairs of springs fixed to and extending laterally from the differential housing and having a pivotal connection with and supporting the sleeves, knuckle members carried by said sleeves, wheel carrying hubs rotatable on said knuckle members, a second pair of shafts arranged in the sleeves and the wheel hubs, and connections between said second shafts and the first shafts and wheel hubs to permit of universal movement of the second shafts relative to the first shafts and of universal movement of the second shafts and hubs one relative to the other.

10. Driving means for wheels of motor vehicles as claimed in claim 9, wherein the knuckle members are mounted on the sleeves by pins arranged to permit of the knuckle members and hubs to have adjustment on an axis in the plane of rotation of the wheels.

11. In a motor vehicle, the combination with the frame, of a housing mounted thereon, differential gearing in the housing operatively connected with the motor driven shaft of the vehicle, a pair of driving shafts rotatably supported at one end and having operative connection with driving elements of the differential gearing; sleeves in which the outer ends of said shafts are rotatably mounted, means fixed at one end to the differential housing and frame and extending laterally therefrom and pivotally supporting said sleeves at the outer ends to have movement on axes extending longitudinally of the vehicle, wheel carrying hubs carried by said sleeves to rotate about the axis thereof and have movement on axes in the plane of rotation of the wheels, and shafts having universal joint connections with the driving shafts and the wheel hubs within the sleeves and hubs to operatively connect the hubs with the driving shafts.

12. In a motor vehicle, the combination with the frame, of a housing mounted thereon, differential gearing in the housing operatively connected with the motor driven shaft of the vehicle, a pair of shafts rotatably supported at one end to extend laterally from opposite sides of the differential housing and having an operative connection with driving elements of the differential gearing, means in which the outer ends of the shafts are rotatably mounted and the shafts and said means to have movement relative to each other in a direction transverse to the axes of the shafts, and springs fixed to the frame and supporting said shaft supporting means to have movement in a direction transverse of the axes of the shafts, wheel carrying hubs rotatably mounted on said means and to have movement on axes in the plane of rotation of the wheels, and means to operatively connect the hubs with the shafts having universal joint connections with the hubs and shafts.

13. In a motor vehicle, the combination with the frame and motive means mounted on the frame, of differential gearing operatively connected with the drive shaft of the motive means, a housing therefor mounted on the frame, shafts rotably supported to extend oppositely from the differential housing and having an operative connection with driving elements of the differential gearing, means in which the outer ends of the shafts are rotatably mounted and the shafts and said means to have movment relative to each other in a direction transverse to the axes of the shafts, springs fixed to the frame and supporting said shaft supporting means, wheel carrying hubs rotatably carried by said shaft supporting means, and means having a universal joint connection with the shafts and a universal joint connection with the hubs to operatively connect the hubs with the shafts.

14. In driving means for wheels of motor vehicles as claimed in claim 13, wherein the shafts have universal joint connections with the driving elements therefor of the differential gearing, and the hubs are mounted on the spring suspended shaft supporting means to have movement on a vertical axis.

15. In means to connect the steering wheels of motor vehicles to the frame thereof and operatively connect the wheels with the motor driven shaft, differential gearing operatively connected with the motor shaft, a housing for said gearing mounted on the frame, a pair of shafts to extend laterally from opposite sides of the differential housing, each shaft embodying a pair of sections having a universal joint connection, one shaft section of each pair of shafts having a universal joint connection with a driving element of the differential gearing, sleeves in which said shaft sections are mounted to rotate and said shaft sections and sleeves having universal movement relative to each other, wheel hubs having universal joint connection with the other shaft section of each pair of shafts, and a pair of springs fixed at one end to and extending laterally and oppositely from the differential housing pivotally connected at the outer ends with the top and bottom of the shaft carrying sleeves to have movement on axes extending transversely to the axis of the shafts.

16. Driving and steering means for the wheels of motor vehicles as claimed in claim 1, wherein the wheel hubs embody knuckle members mounted upon the spring supported sleeves to have movement on an axis extending in the plane of rotation of the wheels, tubular members rotatably mounted on the knuckle members, and disks secured to the outer end of the tubular members and with which the shafts have universal joint connection to operatively connect the hubs with the shafts.

17. In a motor vehicle, a frame and motive means mounted on the frame, differential gearing operatively connected with the power shaft of the motive means, a housing therefor mounted on the frame, shafts rotatably supported at one end and extending laterally from the differential housing and having an operative connection with the driving elements of the differential gearing, wheel carrying hubs, means having universal joint connections with the shafts and wheel hubs to connect the wheel hubs with the shafts, springs fixed to the frame, means suspended from the springs in which the shafts are journaled, and means rotatably carrying the wheel hubs connected with the means suspended from the springs to have adjustment on a vertical axis extending in the plane of rotation of the wheel hubs, and said means suspended from the springs and the wheel hubs forming a lubricant carrying housing for the connections of the wheel hubs with the shafts and said wheel hub carrying means.

18. In a motor vehicle, the combination with a frame, and motive means for the vehicle mounted on the frame, of differential gearing operatively connected with the motive means, a housing for said differential gearing carried by the frame, a pair of shafts extending oppositely from the differential housing and each shaft having an operative connection with the differential gearing, wheel carrying hubs, means upon which the wheel hubs are rotatably mounted and arranged with knuckles, springs fixed to and extended in spaced pairs from the frame, means carried by the springs to which the knuckles of the wheel hub carrying means are pivotally connected to have adjustment on an axis extending in the plane of rotation of the wheel hubs, and driving connections between the wheel hubs and shafts, each connection having a universal joint connection with the shaft and a universal joint connection with the wheel hub, and said universal joint connections being arranged at opposite sides of the pivotal knuckle connection with the means carried by the springs.

19. In driving means for combined driving and steering wheels for motor vehicles, a frame, a wheel carrying hub, a knuckle member on which the wheel hub is rotatably mounted, a drive shaft rotatably supported at one end, means for operatively connecting the wheel hub with the drive shaft having a universal joint connection with the shaft and a universal joint connection with the wheel hub, springs fixed to and extended in spaced relation from the frame, and means suspended from the springs on which the hub carrying knuckle member is pivotally supported to have adjustment on a vertical axis.

In testimony whereof I affix my signature.

RICHARD BUSSIEN.